(12) United States Patent
Zhang

(10) Patent No.: US 8,022,583 B2
(45) Date of Patent: Sep. 20, 2011

(54) DIRECT CURRENT DRIVE MOTOR

(75) Inventor: Xu Zhang, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 155 days.

(21) Appl. No.: 12/471,468

(22) Filed: May 25, 2009

(65) Prior Publication Data

US 2010/0148597 A1   Jun. 17, 2010

(30) Foreign Application Priority Data

Dec. 13, 2008  (CN) .......................... 2008 1 0220110

(51) Int. Cl.
*H02K 9/00* (2006.01)
(52) U.S. Cl. .............................. 310/61; 310/62; 310/179
(58) Field of Classification Search ............. 310/58–59, 310/61–63, 71, 194, 216.08–216.13, 195
See application file for complete search history.

(56) References Cited

U.S. PATENT DOCUMENTS

| | | | |
|---|---|---|---|
| 7,397,158 B2* | 7/2008 | Lee et al. | 310/156.26 |
| 7,777,386 B2* | 8/2010 | Horst | 310/216.004 |
| 2005/0242677 A1* | 11/2005 | Akutsu et al. | 310/179 |
| 2007/0252454 A1* | 11/2007 | Hayashi et al. | 310/71 |
| 2008/0122300 A1* | 5/2008 | Cho et al. | 310/43 |

* cited by examiner

*Primary Examiner* — Quyen Leung
*Assistant Examiner* — Leda Pham
(74) *Attorney, Agent, or Firm* — Matthias Scholl P.C.; Matthias Scholl

(57) ABSTRACT

A direct current drive motor with a stator core, an end insulator, and a coil winding forming a stator, and a housing, a magnetic yoke shell, and multiple magnetic tiles, forming a rotor. The magnetic yoke shell and the magnetic tiles are disposed on the housing. Multiple teeth protrude from a side wall of the stator core. A slot is formed between two adjacent teeth. The coil winding is disposed in the slot and wraps around the tooth.

15 Claims, 7 Drawing Sheets

DIRECT CURRENT DRIVE MOTOR

CROSS-REFERENCE TO RELATED APPLICATIONS

Pursuant to 35 U.S.C. §119 and the Paris Convention Treaty, this application claims the benefit of Chinese Patent Application No. 200810220110.3 filed on Dec. 3, 2008, the contents of which are incorporated herein by reference.

BACKGROUND OF THE INVENTION

1. Field of the Invention

The invention relates to a direct current drive motor.

2. Description of the Related Art

Nowadays, direct current drive motors (DC motors) are widely used. Components of DC motors include a rotor with a housing, a magnetic yoke shell, and multiple magnetic tiles, along with a stator with a stator core, an end insulator, and coil windings. However, conventional designs of DC motors presents many problems, such as, e.g., (a) large disparity between the number of stator slots and magnets on the rotor results in high cogging torque, excessive vibrations, and reduced life span of the motor; (b) high rigidity and limited buffering capacity of the rotor housing, which is usually made of metal, does not allow for absorbing vibrations of the motor; (c) inadequate directionality of winding wires, which are usually wrapped in a clockwise or counterclockwise direction around each tooth and between two adjacent teeth, results in a high cogging torque and high vibrations; d) overlap between transition lines makes it difficult to produce wire windings; and (e) the magnetic induction device is difficult t to install, and the induction signal is poor.

SUMMARY OF THE INVENTION

In view of the above-described problems, it is one objective of the invention to provide a direct current drive motor that features reduced vibration, stable operation, convenient installation, and long working life.

To achieve the above objective, in accordance with one aspect of the present invention, there is provided a direct current drive motor, comprising a stator comprising a stator core, an end insulator and a coil winding, and a rotor comprising a housing, a magnetic yoke shell and multiple magnetic tiles, wherein the magnetic yoke shell and the magnetic tiles are disposed on the housing, multiple teeth protrude from a side wall of the stator core, a slot is formed between two adjacent teeth, and the coil winding is disposed in the slot and wraps around the tooth.

In certain classes of this embodiment, the number of the slots is 36.

In certain classes of this embodiment, the slots are uniformly distributed in a circumferential direction, and an area thereof is the same.

In certain classes of this embodiment, the number of the magnetic tiles is 42, and thus 42 poles are formed.

In certain classes of this embodiment, the motor further comprises a magnetic induction device.

In certain classes of this embodiment, the magnetic induction device comprises a fixed mount, a PCB board, a Hall component, a connector, and a capacitor.

In certain classes of this embodiment, the PCB board is disposed on the fixed mount, the Hall component, the connector, and the capacitor are disposed on the PCB board, and the fixed mount is fixedly disposed on the end insulator.

In certain classes of this embodiment, the housing comprises a side wall, an end cover, a cavity, an opening, a base, and a central hole.

In certain classes of this embodiment, the housing is integrally formed by injection molding, the end cover is disposed at the bottom of the side wall, the cavity is formed between the side wall and the end cover, the opening is disposed at the top of the housing, the base is disposed at the center of the end cover, and the central hole is disposed at the center of the base and connected to a transmission shaft.

In certain classes of this embodiment, the central hole and the base are integrally formed by injection molding.

In certain classes of this embodiment, the motor further comprises a rotating spline connected to the base.

In certain classes of this embodiment, the central hole is disposed in the rotating spline.

In certain classes of this embodiment, the motor further comprises a rotating spline disposed in the base.

In certain classes of this embodiment, the central hole is disposed in the rotating spline.

In certain classes of this embodiment, the base is connected to the side wall via multiple wind wheels, and an air inlet is disposed between adjacent wind wheels.

In certain classes of this embodiment, the magnetic yoke shell and the magnetic tiles are disposed on the inner portion of the side wall.

In certain classes of this embodiment, the magnetic yoke shell, the magnetic tiles can also be integrally formed with the housing and disposed in the side wall.

In certain classes of this embodiment, the coil windings comprise multiple in-phase windings and anti-phase windings, the winding wires of the in-phase windings are firstly wrapped around two adjacent teeth and then cross four teeth, winding directions of the two adjacent teeth of the in-phase windings are opposite, and winding directions of adjacent teeth of the anti-phase windings are the same.

In certain classes of this embodiment, multiple cylinders are disposed on the end insulator, multiple protruding portions are disposed at the bottom of the cylinder and between adjacent cylinders, a transition line between two adjacent teeth is hang on the cylinder and supported by the top of the protruding portion, and the protruding portions have different height.

Advantages of the invention include the following:

1) 36 slots are disposed on the stator core, and 42 poles are formed on the rotor, and thus cogging torque is relatively low and the motor vibrates only slightly and generates little noise, which greatly increases working life of the motor;

2) the housing of the rotor is formed by injection molding, and thus has relatively small rigidity and large buffer capacity to absorb vibration from the motor;

3) the winding wires of the in-phase windings are first wrapped around two adjacent teeth and then run across the next four teeth, the winding directions at the two adjacent teeth of the in-phase windings are opposite, and the winding directions at the adjacent teeth of the anti-phase windings are the same, which causes low cogging torque and prevents vibrations;

4) the protruding portions have different height, thus transition lines do not overlap with each other which makes it easier to produce wire windings;

5) the magnetic induction device is easy for installation and location, and the induction signal is relatively good.

BRIEF DESCRIPTION OF THE DRAWINGS

Detailed description will be given below with reference to accompanying drawings, in which.

DETAILED DESCRIPTION OF THE EMBODIMENTS

Figure 1:
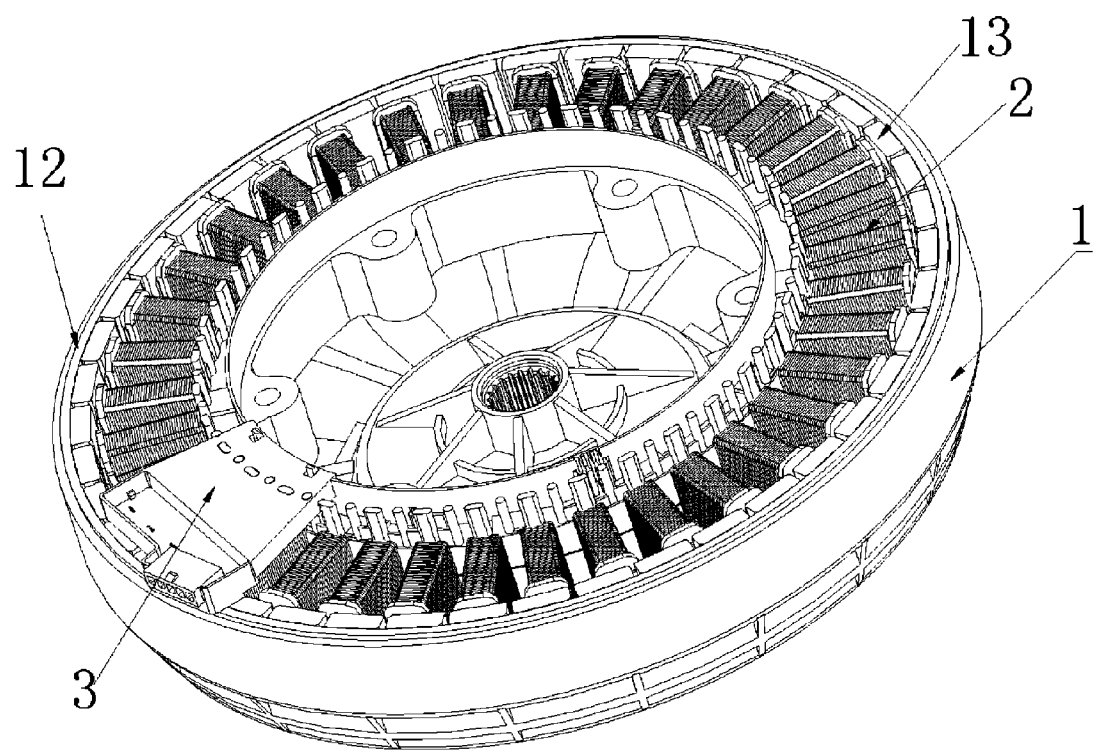
FIG. 1 is a schematic view of a direct current drive motor of an exemplary embodiment of the invention.
Figure 2:
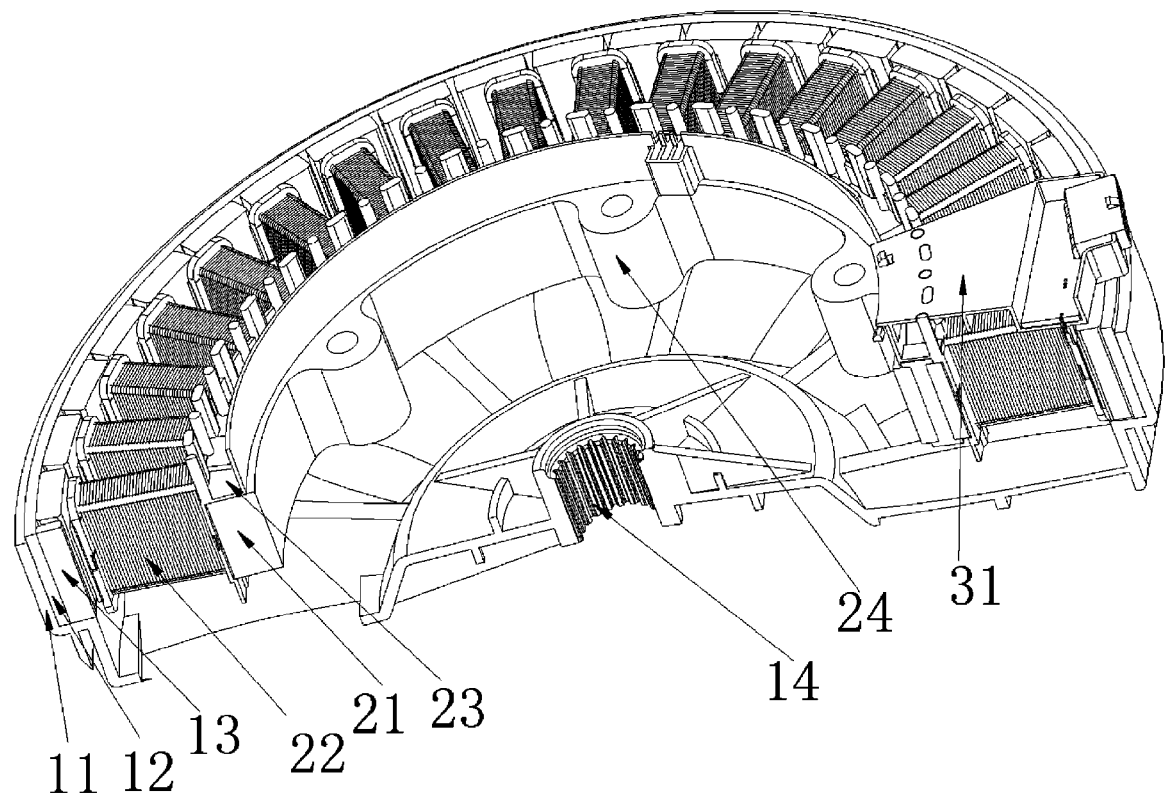
FIG. 2 is a perspective view of a cut of section of the motor shown in FIG. 1.
Figure 6:
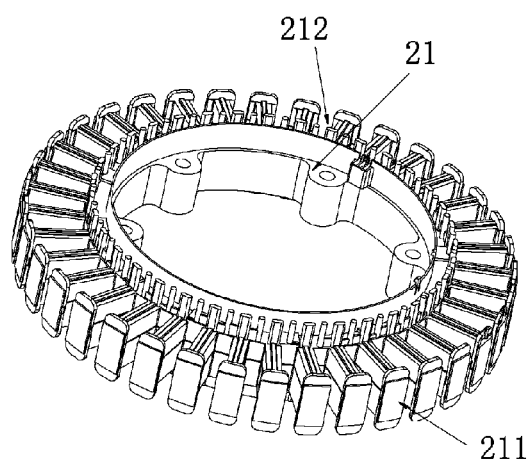
FIG. 6 is a schematic view of a stator core according an exemplary embodiment of the invention.

As shown in FIGS. 1, 2 and 6, a direct current drive motor of the invention comprises a rotor 1, a stator 2, and a magnetic induction device 3. The rotor 1 is disposed outside the stator 2. The stator 2 comprises a stator core 21, an end insulator 23, and a coil winding 22. The rotor 1 comprises a housing 11, a magnetic yoke shell 12, and multiple magnetic tiles 13.

36 slots 212 are disposed on the stator core 21. Multiple pins 24 protrude from inner wall of the stator core 21. The number of the magnetic tiles 13 is 42, and thus 42 poles are formed.

The slots 212 are uniformly distributed in a circumferential direction, and their size is equal.

The magnetic induction device 3 comprises a fixed mount 31, a PCB board, a Hall component, a connector, and a capacitor. The PCB board is disposed on the fixed mount 31, the Hall component, the connector, and the capacitor are disposed on the PCB board, and the fixed mount 31 is fixedly disposed on the end insulator 23.

The coil winding 22 is made of enameled aluminum wire or enameled copper wire.

Figure 3:
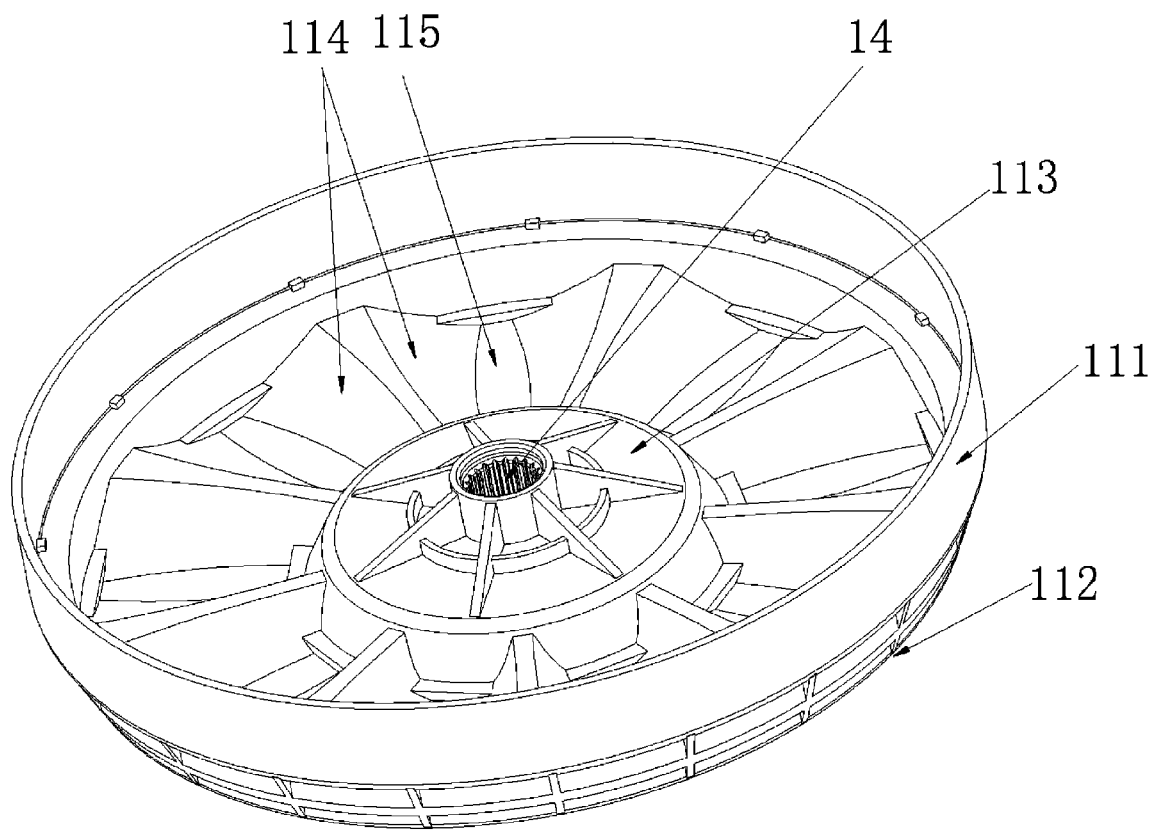
FIG. 3 is a schematic view of a housing for the rotor shown in FIG. 1.
Figure 4:
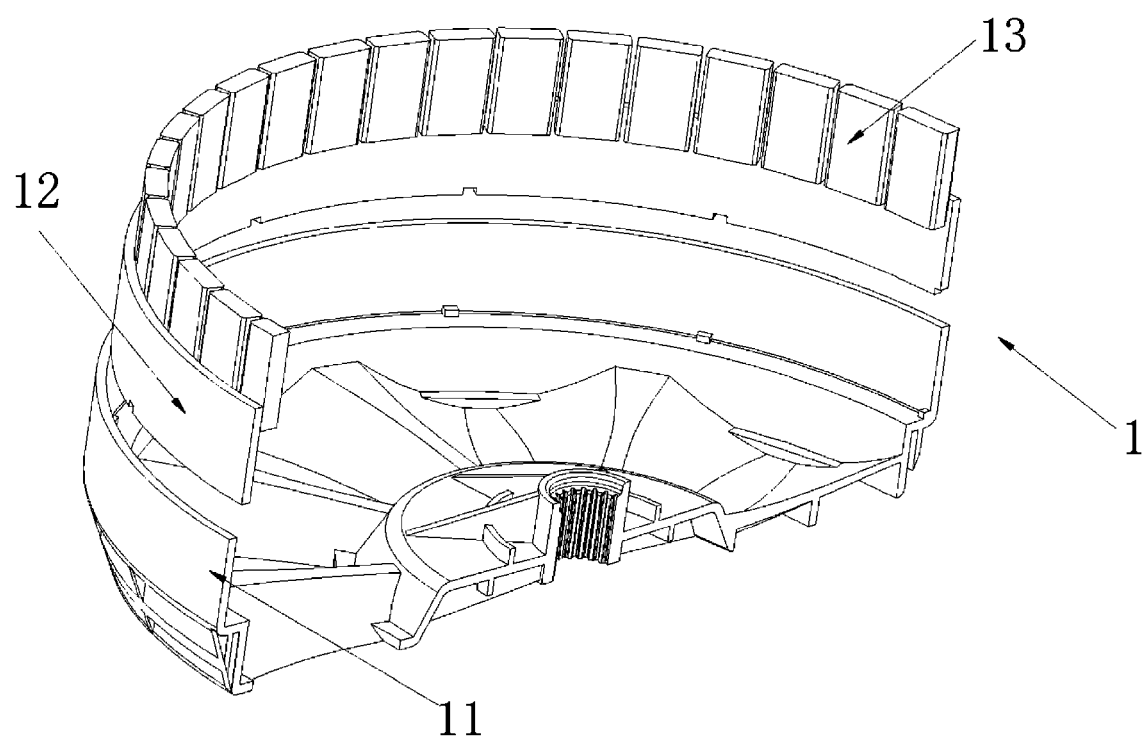
FIG. 4 is a schematic view of a rotor according to an exemplary embodiment of the invention.

As shown in FIGS. 3 and 4, the housing 11 of a first embodiment of the invention is integrally formed by injection molding, and comprises a side wall 111 and an end cover 112 disposed at the bottom of the side wall 111. A cavity is formed between the side wall 111 and the end cover 112. An opening is disposed at the top of the housing 11. A base 113 is disposed at the center of the end cover 112. A central hole 14 is disposed at the center of the base 113 and connected to a transmission shaft. The magnetic yoke shell 12 and the magnetic tiles 13 are disposed on inner wall of the side wall 111.

Figure 5:
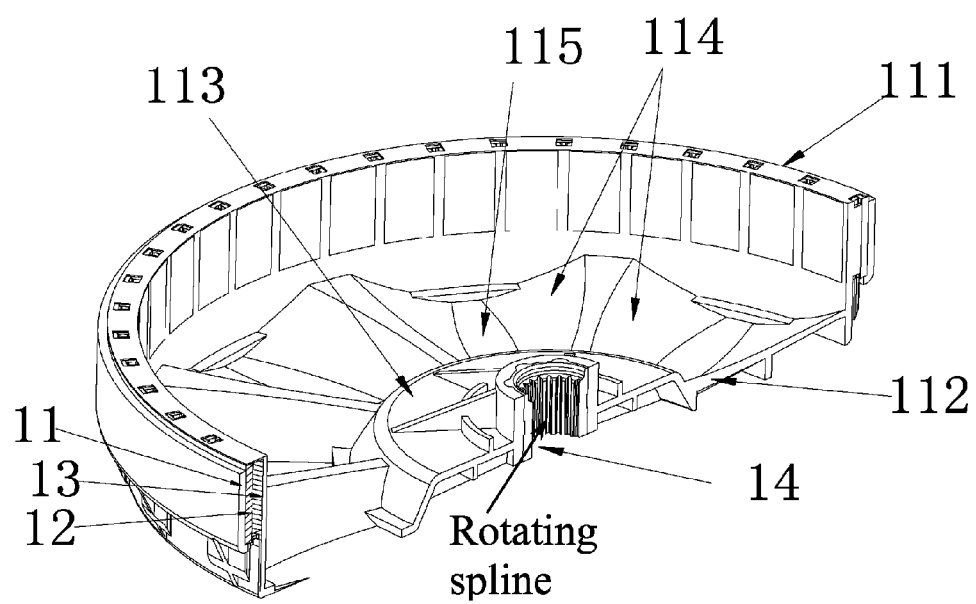
FIG. 5 is a schematic view of a rotor according to another exemplary embodiment of the invention.

As shown in FIG. 5, the housing 11 of the second embodiment of the invention is integrally formed by injection molding with the magnetic yoke shell 12 and the magnetic tiles 13. The magnetic yoke shell 12 and the magnetic tiles 13 are received in the side wall 111.

The central hole 14 and the base 113 are integrally formed by injection molding. In another embodiment, a rotating spline is connected to the base 113, and the central hole 14 is disposed in the rotating spline. In a further embodiment, the rotating spline is disposed in the base 113, and the central hole 14 is disposed in the rotating spline.

The base 113 is connected to the side wall 111 via multiple wind wheels 114, and an air inlet 115 is disposed between adjacent wind wheels 114.

Figure 7:
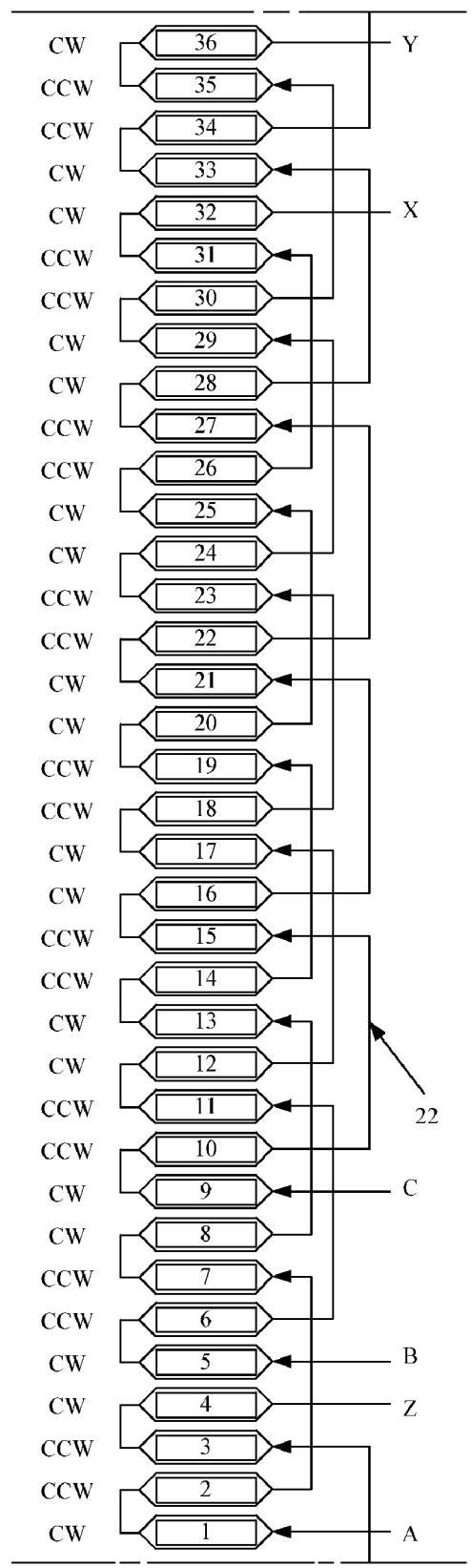
FIG. 7 is a schematic view of a coil winding according an exemplary embodiment of the invention.

As shown in FIGS. 6 and 7, multiple teeth 211 protrude from a side wall of the stator core 21, and a slot 212 is formed between two adjacent teeth 211. The coil winding 22 is disposed in the slot 212 and wraps around the tooth 211. The coil winding 22 comprises multiple in-phase windings and anti-phase windings. The winding wires of the in-phase windings are firstly wrapped around two adjacent teeth 211 and then cross four teeth 211 thereof, winding directions of the two adjacent teeth 211 of the in-phase windings are opposite, and winding directions of adjacent teeth 211 of the anti-phase windings are the same.

In FIG. 7, the coil winding 22 comprises a U phase, a V phase and a W phase. Both ends of the U-phase winding are labeled A and X, both ends of the V-phase winding are labeled B and Y, and both ends of the W-phase winding are labeled C and Z. The U-phase winding wraps around the $1^{st}$, the $2^{nd}$, the $7^{th}$, the $8^{th}$, the $13^{th}$, the $14^{th}$, the $19^{th}$, the $20^{th}$, the $25^{th}$, the $26^{th}$, the 31th and the 32th teeth. The V-phase winding wraps around the $3^{rd}$, the $4^{th}$, the $9^{th}$, the $10^{th}$, the $15^{th}$, the $16^{th}$, the 21th, the 22th, the $27^{th}$, the $28^{th}$, the 33th and the $34^{th}$ teeth. The W-phase winding wraps around the $5^{th}$, the $6^{th}$, the $11^{th}$, the $12^{th}$, the $17^{th}$, the $18^{th}$, the 23th, the $24^{th}$, the $29^{th}$, the $30^{th}$, the $35^{th}$ and the $36^{th}$ teeth.

Figure 8:
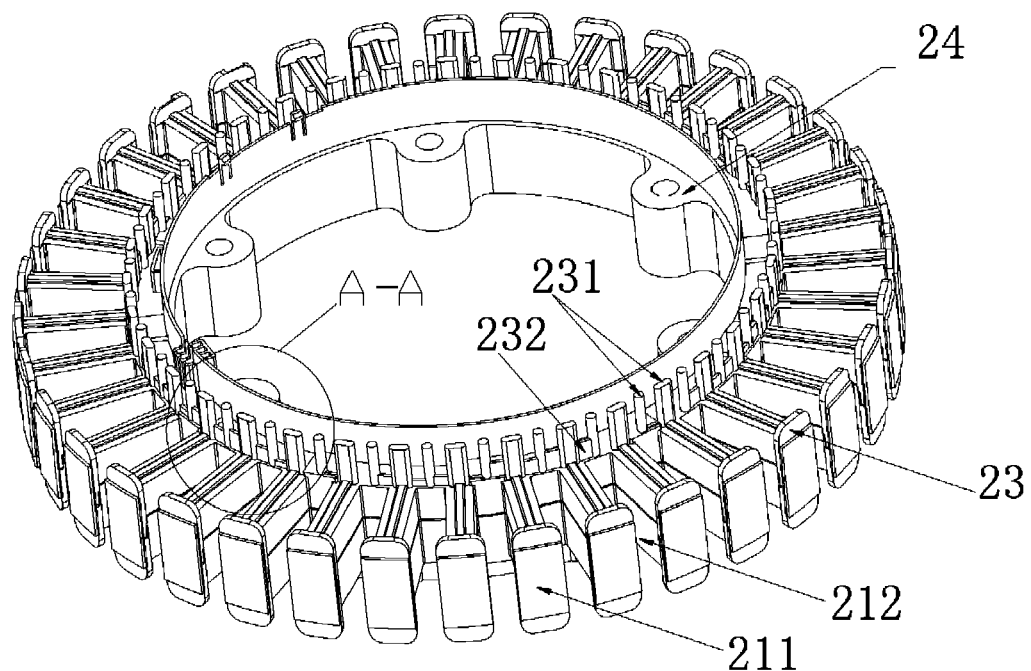
FIG. 8 is a schematic view of a stator core with an end insulator according to an exemplary embodiment of the invention.
Figure 9:
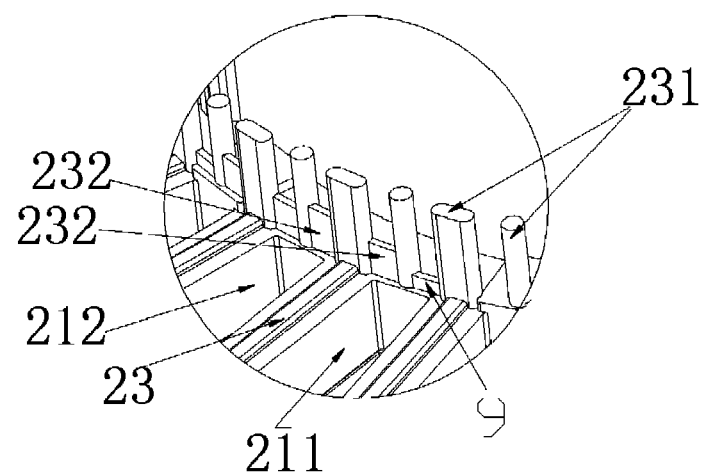
FIG. 9 is an enlarged view of the stator core along the A-A direction shown in FIG. 8.

As shown in FIGS. 8 and 9, multiple cylinders 231 are disposed on the end insulator 23. Multiple protruding portions 232 are disposed at the bottom of the cylinder 231 and between adjacent cylinders 231. A transition line between two adjacent teeth 211 is hang on the cylinder 231 and supported by the top of the protruding portion 232. The protruding portions 232 have different height, so that transition lines of the coil windings 22 with different phases are not connected to each other in space.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A direct current drive motor, comprising
   a stator comprising a stator core, an end insulator, and a coil winding; and
   a rotor comprising a housing, a magnetic yoke shell, and a plurality of magnetic tiles;
wherein
   said magnetic yoke shell and said magnetic tiles are disposed on said housing;
   a plurality of teeth protrudes from a side wall of said stator core;
   36 slots are disposed each between two adjacent teeth on said stator core;
   the number of said magnetic tiles is 42, whereby forming 42 magnetic poles;
   said coil winding is disposed in said slot and wraps around said teeth;
   said housing comprises a base and a side wall;
   said base is connected to said side wall via a plurality of wind wheels; and
   an air inlet is disposed between two adjacent wind wheels.

2. The motor of claim 1, wherein said slots are uniformly distributed circumferentially, and said slots are of the same size.

3. The motor of claim 1, further comprising a magnetic induction device.

4. The motor of claim 1, wherein
   said housing is integrally formed by injection molding;

said end cover is directly connected to said side wall;
said cavity is formed between said side wall and said end cover;
said opening is disposed at a top of said housing;
said base is disposed at a center of said end cover; and
said central hole is disposed at the center of said base.

5. The motor of claim 1, wherein said central hole and said base are integrally formed by injection molding.

6. The motor of claim 1, further comprising a rotating spline connected to said base.

7. The motor of claim 6, wherein said central hole is disposed in said rotating spline.

8. The motor of claim 1, further comprising a rotating spline disposed in said base.

9. The motor of claim 8, wherein said central hole is disposed in said rotating spline.

10. The motor of claim 1, wherein said magnetic yoke shell and said magnetic tiles are disposed on an inner circumference of said side wall.

11. The motor of claim 1, wherein said magnetic yoke shell and said magnetic tiles are integrally formed with said housing and are disposed in said side wall.

12. The motor of claim 1, wherein
said coil windings comprise a plurality of in-phase windings and a plurality of anti-phase windings;
winding wires of said in-phase windings are firstly wrapped around two adjacent teeth and then cross four teeth;
adjacent teeth of said in-phase windings are oriented in opposite directions;
adjacent teeth of said anti-phase windings are oriented in the same direction.

13. The motor of claim 12, wherein
a plurality of cylinders is disposed on said end insulator;
multiple protruding portions are disposed at the bottom of said cylinders and between adjacent cylinders;
a transition line between two adjacent teeth is disposed on said cylinders and supported by the top of said protruding portions; and
said protruding portions have different height from one another.

14. The motor of claim 1, wherein said coil winding comprises a U phase winding, a V phase winding and a W phase winding; the U-phase winding wraps around the 1st, the 2nd, the 7th, the 8th, the 13th, the 14th, the 19th, the 20th, the 25th, the 26th, the 31st and the 32nd tooth; the V-phase winding wraps around the 3rd, the 4th, the 9th, the 10th, the 15th, the 16th, the 21st, the 22nd, the 27th, the 28th, the 33rd and the 34th tooth; and the W-phase winding wraps around the 5th, the 6th, the 11st, the 12nd, the 17th, the 18th, the 23rd, the 24th, the 29th, the 30th, the 35th and the 36th tooth.

15. The motor of claim 1, wherein said rotating spline and said base are integrally formed by injection molding.

* * * * *